United States Patent
Shim et al.

(10) Patent No.: US 9,159,495 B2
(45) Date of Patent: Oct. 13, 2015

(54) MULTILAYER CERAMIC ELECTRONIC COMPONENT, MANUFACTURING METHOD THEREOF AND BOARD FOR MOUNTING THE SAME

(71) Applicant: SAMSUNG ELECTRO-MECHANICS CO., LTD., Suwon, Gyunggi-do (KR)

(72) Inventors: Jae Hyuk Shim, Gyunggi-do (KR); Dae Bok Oh, Gyunggi-do (KR); Jae Yeol Choi, Gyunggi-do (KR); Myung Jun Park, Gyunggi-do (KR); Young Sook Lee, Gyunggi-do (KR)

(73) Assignee: SAMSUNG ELECTRO-MECHANICS CO., LTD., Suwon (KR)

( * ) Notice: Subject to any disclaimer, the term of this patent is extended or adjusted under 35 U.S.C. 154(b) by 175 days.

(21) Appl. No.: 14/060,355

(22) Filed: Oct. 22, 2013

(65) Prior Publication Data

US 2015/0041194 A1    Feb. 12, 2015

(30) Foreign Application Priority Data

Aug. 12, 2013    (KR) .................. 10-2013-0095404

(51) Int. Cl.
*H01G 4/30*    (2006.01)
*H01G 2/06*    (2006.01)

(52) U.S. Cl.
CPC . *H01G 4/30* (2013.01); *H01G 2/065* (2013.01)

(58) Field of Classification Search
CPC ............. H01G 4/32; H01G 4/12; H01G 4/30; H01G 4/228
USPC ................ 361/301.1, 301.2, 301.4, 303–305, 361/306.1, 306.3, 321.1, 321.2
See application file for complete search history.

(56) References Cited

U.S. PATENT DOCUMENTS 6,292,353 B1 *   9/2001   Haratani et al. ........... 361/321.2
7,436,650 B2 * 10/2008   Oguni et al. ............... 361/321.2

(Continued)

FOREIGN PATENT DOCUMENTS

| JP | 04-034913 A | 2/1992 |
| JP | 08-017679 A | 1/1996 |
| JP | 2005-129802 A | 5/2005 |
| JP | 2013-038332 A | 2/2013 |
| KR | 2003-0014586 A | 2/2003 |
| KR | 10-0456040 B1 | 10/2004 |

OTHER PUBLICATIONS

Japanese Office Action issued in Japanese Application No. 2013-222411 dated Oct. 7, 2014, with English Translation.

*Primary Examiner* — Nguyen T Ha
(74) *Attorney, Agent, or Firm* — McDermott Will & Emery LLP

(57) ABSTRACT

There is provided a multilayer ceramic electronic component including a ceramic body including a plurality of dielectric layers stacked in a thickness direction and satisfying T/W>1.0 when it is defined that a width thereof is W and a thickness thereof is T, a plurality of first and second internal electrodes disposed in the ceramic body so as to face each other, having the dielectric layer interposed therebetween, and alternately exposed through both end surfaces of the ceramic body, and first and second external electrodes including head parts formed on both end surfaces of the ceramic body and two band parts connected to the head parts and formed on portions of upper and lower main surfaces of the ceramic body so as to be spaced apart from each other in a width direction, and electrically connected to the first and second internal electrodes, respectively.

14 Claims, 5 Drawing Sheets

(56) References Cited

U.S. PATENT DOCUMENTS

| | | | |
|---|---|---|---|
| 7,463,474 B2 * | 12/2008 | Ritter et al. | 361/306.1 |
| 7,589,954 B2 * | 9/2009 | Kusano et al. | 361/321.4 |
| 8,248,752 B2 * | 8/2012 | Hur et al. | 361/311 |
| 8,351,180 B1 * | 1/2013 | Ahn et al. | 361/321.2 |
| 2003/0030510 A1 | 2/2003 | Sasaki et al. | |
| 2003/0080830 A1 | 5/2003 | Matsumura et al. | |
| 2005/0088803 A1 | 4/2005 | Umeda et al. | |
| 2013/0038979 A1 | 2/2013 | Togashi | |

* cited by examiner

MULTILAYER CERAMIC ELECTRONIC COMPONENT, MANUFACTURING METHOD THEREOF AND BOARD FOR MOUNTING THE SAME

CROSS-REFERENCE TO RELATED APPLICATIONS

This application claims the benefit of Korean Patent Application No. 10-2013-0095404 filed on Aug. 12, 2013, with the Korean Intellectual Property Office, the disclosure of which is incorporated herein by reference.

BACKGROUND OF THE INVENTION

1. Field of the Invention

The present invention relates to a multilayer ceramic electronic component, a manufacturing method thereof, and a board for mounting the same.

2. Description of the Related Art

In accordance with the recent trend toward miniaturization of electronic products, a multilayer ceramic electronic component used in the electronic products has been demanded to have a small size and high capacitance.

Therefore, efforts to allow dielectric layers and internal electrodes to be thinned and stacked in increasingly greater numbers have been attempted using various methods, and recently, a multilayer ceramic electronic component in which a thickness of the dielectric layers is relatively low and the number of stacked layers is increased has been manufactured.

It is possible that the multilayer ceramic electronic component is miniaturized and the dielectric layer and the internal electrode are thinned, which allows the number of stacked layers to be increased for achieving a high degree of capacitance.

However, in the case in which the number of stacked layers is increased while the thicknesses of the dielectric layer and the internal electrode are thinned as described above, it is possible to implement high capacitance multilayer ceramic electronic components, but the manufactured multilayer ceramic electronic components have a thickness greater than a width thereof due to an increase in the number of stacked layers.

In the case in which the multilayer ceramic electronic component has a thickness greater than a width as described above, external electrodes formed on both end surfaces of the multilayer ceramic electronic component generally have a rounded, convex circumferential surface.

Therefore, when the multilayer ceramic electronic component is mounted on a printed circuit board or the like, the multilayer ceramic electronic component may not be maintained in a state in which it is mounted, but may topple over frequently, such that a rate of defects in mounting the multilayer ceramic electronic component has increased.

The following Related Art Document discloses a multilayer ceramic condenser having small size and high capacitance, but does not describe a unit for preventing a multilayer ceramic condenser from toppling over when the condenser is mounted on a printed circuit board.

RELATED ART DOCUMENT

Japanese Patent Laid-Open Publication No. JP 2005-129802

SUMMARY OF THE INVENTION

An aspect of the present invention provides a multilayer ceramic electronic component capable of having a thickness greater than a width thereof, due to an increase in the number of stacked layers to achieve a high degree of capacitance, and capable of preventing the multilayer ceramic electronic component from toppling over when being mounted on a printed circuit board or the like and thus decreasing mounting defects and the occurrence of short-circuits.

According to an aspect of the present invention, there is provided a multilayer ceramic electronic component including: a ceramic body including a plurality of dielectric layers stacked in a thickness direction and satisfying T/W>1.0 when it is defined that a width thereof is W and a thickness thereof is T; a plurality of first and second internal electrodes disposed in the ceramic body so as to face each other, having the dielectric layer interposed therebetween, and alternately exposed through both end surfaces of the ceramic body; and first and second external electrodes including head parts formed on both end surfaces of the ceramic body and two band parts connected to the head parts and formed on portions of upper and lower main surfaces of the ceramic body so as to be spaced apart from each other in a width direction, and electrically connected to the first and second internal electrodes, respectively.

According to another aspect of the present invention, there is provided a multilayer ceramic electronic component including: a ceramic body including a plurality of dielectric layers stacked in a width direction and satisfying T/W>1.0 when it is defined that a width thereof is W and a thickness thereof is T; a plurality of first and second internal electrodes disposed in the ceramic body so as to face each other, having the dielectric layer interposed therebetween, and alternately exposed through both end surfaces of the ceramic body; and first and second external electrodes formed from both end surfaces to portions of both of upper and lower main surfaces of the ceramic body and electrically connected to the first and second internal electrodes, respectively, wherein the first and second external electrodes include head parts formed on both end surfaces of the ceramic body and two band parts connected to the head parts and formed on portions of upper and lower main surfaces of the ceramic body so as to be spaced apart from each other in a width direction and are electrically connected to the first and second internal electrodes, respectively.

According to another aspect of the present invention, there is provided a manufacturing method of a multilayer ceramic electronic component, the manufacturing method including: preparing a multilayer body by stacking and compressing a plurality of ceramic sheets having first and second internal electrodes formed thereon so that the first and second internal electrodes face each other, having the ceramic sheet therebetween, and preparing a ceramic body having first and second main surfaces opposing each other in a thickness direction thereof, first and second end surfaces in a length direction thereof, to which the first and second internal electrodes are alternately exposed, and first and second side surfaces in a width direction thereof, by cutting the multilayer body to be separated into portions corresponding to regions thereof forming respective single capacitors to then be sintered; and forming first and second external electrodes in the ceramic body so as to be electrically connected to the first and second internal electrodes, respectively, wherein in the forming of the first and second external electrodes, in a thickness-width cross section of the ceramic body, head parts are formed on the first and second end surfaces and two band parts are formed on the first and second main surfaces so as to be spaced apart from each other by applying a conductive paste to both edge parts at which the first and second main surfaces and the first and second side surfaces contact each other.

In the preparing of the multilayer body, the ceramic sheets may be stacked in the thickness direction or in the width direction.

When it is defined that a width of the ceramic body is W and a width of the band part is a, $0.10 \leq a/W \leq 0.45$ may be satisfied.

When a thickness of the band part is defined as S, $2 \leq S \leq 40$ μm may be satisfied.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE EMBODIMENTS

Figure 1:
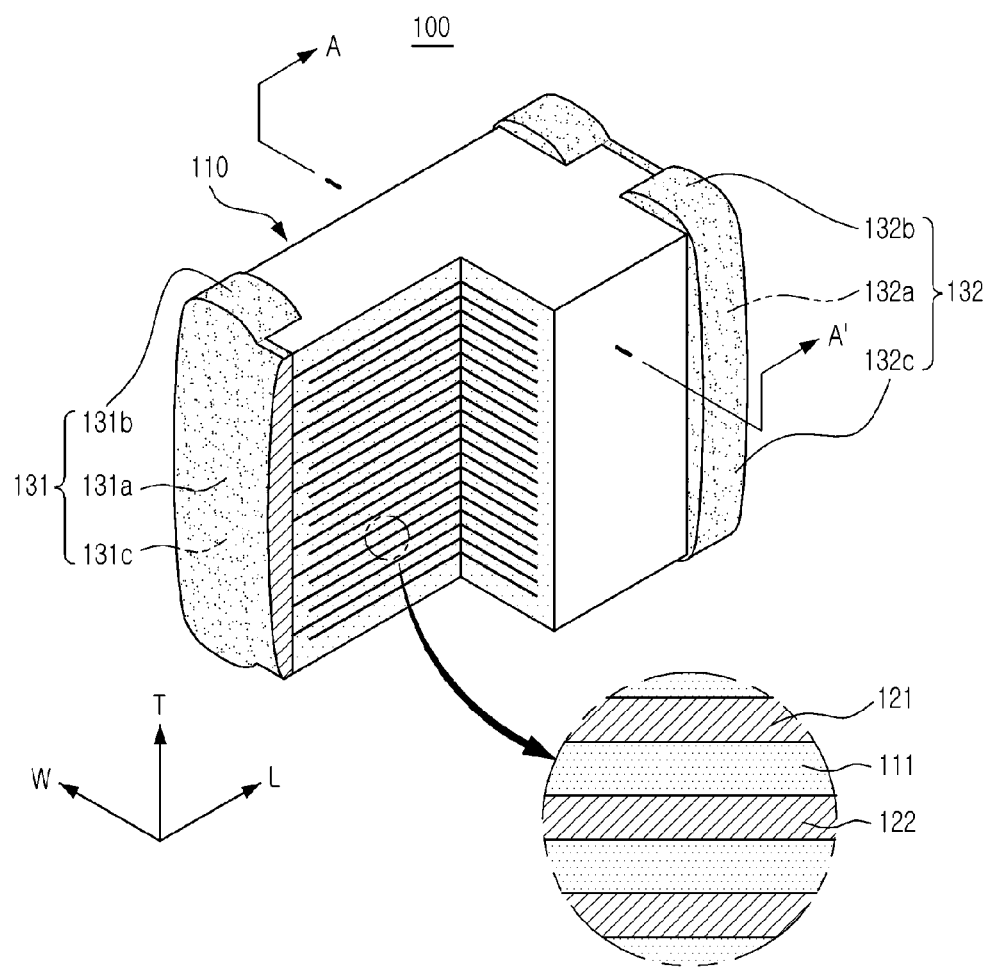
FIG. 1 is a partially cut-away perspective view schematically showing a multilayer ceramic capacitor according to an embodiment of the present invention.

Hereinafter, embodiments of the present invention will be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art. In the drawings, the shapes and dimensions of elements may be exaggerated for clarity, and the same reference numerals will be used throughout to designate the same or like elements.

Hereinafter, a multilayer ceramic electronic component according to an embodiment of the present invention will be described. In particular, a multilayer ceramic capacitor will be described, but the present invention is not limited thereto.

Multilayer Ceramic Capacitor

FIG. 1 is a partially cut-away perspective view schematically showing a multilayer ceramic capacitor according to an embodiment of the present invention.

Referring to FIG. 1, the multilayer ceramic capacitor 100 according to the embodiment of the present invention may include a ceramic body 110, a plurality of first and second internal electrodes 121 and 122, and first and second external electrodes 131 and 132.

The ceramic body 110 may be formed by stacking and sintering a plurality of dielectric layers 111 in a thickness direction, wherein the adjacent dielectric layers 111 may be integrated so as not to confirm a boundary therebetween without using a scanning electron microscope (SEM).

The ceramic body 110 is not particularly limited in view of a shape, and for example, may have a hexahedral shape.

Directions in the hexahedron of the ceramic body 110 will be defined in order to clearly describe the embodiment of the present invention. L, W and T shown in FIG. 1 refer to a length direction, a width direction, and a thickness direction, respectively.

In addition, for convenience of explanation in the embodiment of the present invention, it is defined that surfaces opposing each other in the thickness direction of the ceramic body 110 are first and second main surfaces, surfaces connecting the first and second main surfaces and opposing each other in the length direction of the ceramic body 110 are first and second end surfaces, and surfaces opposing each other in the width direction of the ceramic body 110 are first and second side surfaces.

The ceramic body 110 may have an increased number of stacked dielectric layers 111 in order to achieve a high degree of capacitance, and may satisfy T/W>1.0 when it is defined that a width thereof is W and a thickness thereof is T, thereby having a thickness greater than the width.

The dielectric layer 111 may include a ceramic material having a high dielectric constant, and for example, a barium titanate ($BaTiO_3$)-based ceramic powder, or the like, but the present invention is not particularly limited as long as sufficient capacitance is capable of being obtained.

In addition, the dielectric layer 111 may further include transition metal oxides or carbides, rare-earth elements, various kinds of ceramic additives such as magnesium (Mg), aluminum (Al) or the like, organic solvents, plasticizers, binders, dispersants, or the like, in addition to the ceramic powder, as needed.

The first and second internal electrodes 121 and 122 having different polarities may be disposed so as to face each other, having a ceramic sheet forming the dielectric layer 111 therebetween, and may be formed in the ceramic body 110 so as to be exposed through the first and second end surfaces of the ceramic body 110, respectively.

In this case, the first and second internal electrodes 121 and 122 may be electrically insulated from each other by the dielectric layer 111 interposed therebetween.

In addition, the first and second internal electrodes 121 and 122 may be formed of a conductive metal, for example, one of silver (Ag), palladium (Pd), platinum (Pt), nickel (Ni), and copper (Cu), alloys thereof or the like, but the present invention is not limited thereto.

The first and second external electrodes 131 and 132 may include first and second head parts 131a and 132a formed on the first and second end surfaces of the ceramic body 110 and two of first and second band parts 131b and 132b connected to the first and second head parts 131a and 132a, respectively, and formed on the first and second main surfaces of the ceramic body 110 so as to be spaced apart from each other in a width direction.

The first and second head parts 131a and 132a may be electrically connected to the plurality of first and second internal electrodes 121 and 122 alternately exposed through the first and second end surfaces, respectively. The first and second band parts 131b and 132b may be a mounting part at the time of being mounted on a printed circuit board or the like.

Here, the first and second external electrodes 131 and 132 may include first and second side connecting parts 131c and 132c formed on the first and second side surfaces of the ceramic body 110 and respectively connected to the first and second head parts 131a and 132a and the first and second band parts 131b and 132b, so as to improve moisture-resistance.

In addition, the first and second external electrodes 131 and 132 may be formed of a conductive metal, for example, silver (Ag), nickel (Ni), copper (Cu), or the like. The first and second external electrodes 131 and 132 may be formed by applying a conductive paste prepared by adding glass frit to a conductive metal powder to then be sintered, but the present invention is not limited thereto.

Meanwhile, the first and second band parts 131b and 132b may include first and second plating layers (not shown) formed thereon, as needed.

The first and second plating layers are to increase adhesion strength between the multilayer ceramic capacitor and the printed circuit board at the time of mounting the multilayer ceramic capacitor 100 on the printed circuit board by a solder.

The first and second plating layers may include a nickel (Ni) plating layer formed on the first and second band parts 131b and 132b and a tin (Sn) plating layer formed on the nickel plating layer, but the present invention is not limited thereto.

Figure 2:
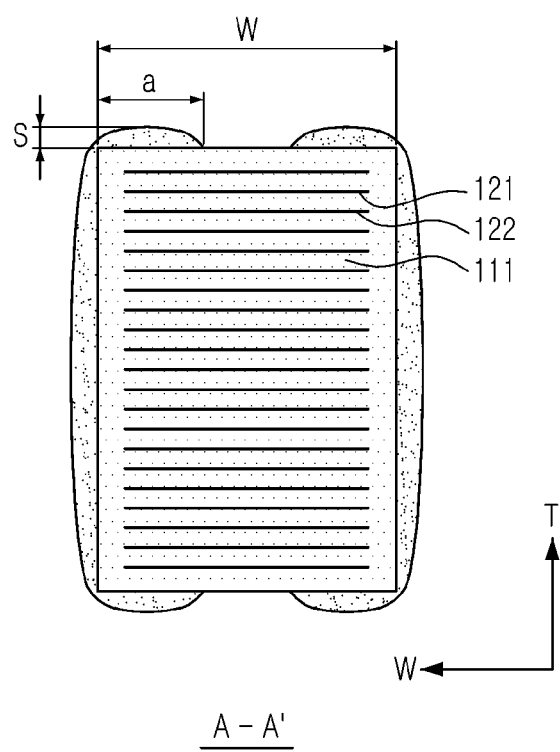
FIG. 2 is a cross-sectional view taken along line A-A' of FIG. 1.

FIG. 2 is a cross-sectional view taken along line A-A' of FIG. 1 and shows a thickness-width cross section of the multilayer ceramic capacitor according to the embodiment of the present invention.

It may be appreciated from FIG. 2 that when it is defined that a width of the ceramic body 110 is W and a width of the band parts 131b and 132b on the external electrodes is a, $0.10 \leq a/W \leq 0.45$ may be satisfied.

TABLE 1

| # | a/W | Whether or not chip topples over when being mounted | Whether or not defects in reliability occur |
|---|------|------|------|
| 1 | 0.05 | 3/50ea | 2/200ea |
| 2 | 0.10 | 0/50ea | 0/200ea |
| 3 | 0.15 | 0/50ea | 0/200ea |
| 4 | 0.20 | 0/50ea | 0/200ea |
| 5 | 0.25 | 0/50ea | 0/200ea |
| 6 | 0.30 | 0/50ea | 0/200ea |
| 7 | 0.35 | 0/50ea | 0/200ea |
| 8 | 0.40 | 0/50ea | 0/200ea |
| 9 | 0.45 | 0/50ea | 0/200ea |
| 10 | 0.50 | 4/50ea | 1/200ea |

Table 1 above shows results obtained by experimenting with whether or not a chip will topple over when being mounted and whether or not defects in reliability will occur, depending on values of a/W.

It can be appreciated from Table 1 above that in Sample 1 in which a/W is 0.05, 3 out of 50 chips toppled over when being mounted, and defects in reliability in 2 out of 200 chips were found in reliability defect experiments.

In addition, in Sample 10 in which a/W is 0.50, 4 out of 50 chips toppled over when being mounted, and defect in reliability in 1 out of 200 chips was found in reliability defect experiments.

Meanwhile, in Samples 2 to 9 that the values of a/W are within the range according to the embodiment of the present invention, chips did not topple over when being mounted and the defects in reliability were not found.

In addition, when it is defined that a thickness of the band parts 131b and 132b is S, $2 \leq S \leq 40$ μm may be satisfied.

TABLE 2

| # | S (μm) | Whether or not chip topples over when being mounted | Whether or not capacitance is satisfied |
|---|------|------|------|
| 1 | 1 | 5/50ea | 100% |
| 2 | 2 | 0/50ea | 100% |
| 3 | 5 | 0/50ea | 100% |
| 4 | 10 | 0/50ea | 100% |
| 5 | 20 | 0/50ea | 100% |
| 6 | 30 | 0/50ea | 100% |
| 7 | 40 | 0/50ea | 100% |
| 8 | 50 | 0/50ea | 95% |
| 9 | 60 | 3/50ea | 85% |

Table 2 above shows results obtained by experimenting with whether or not the chip toppled over when being mounted and whether or not reference capacitance was satisfied, depending on values of S.

It can be appreciated from Table 2 above that in Sample 1 in which S is 1 μm, 5 out of 50 chips toppled over when being mounted, and in Samples 8 and 9 in which S is greater than 40 μm, the reference capacitance was not satisfied. In particular, in Sample 9, the reference capacitance was not satisfied and 3 out of 50 chips toppled over when being mounted.

Modified Example

Figure 3:
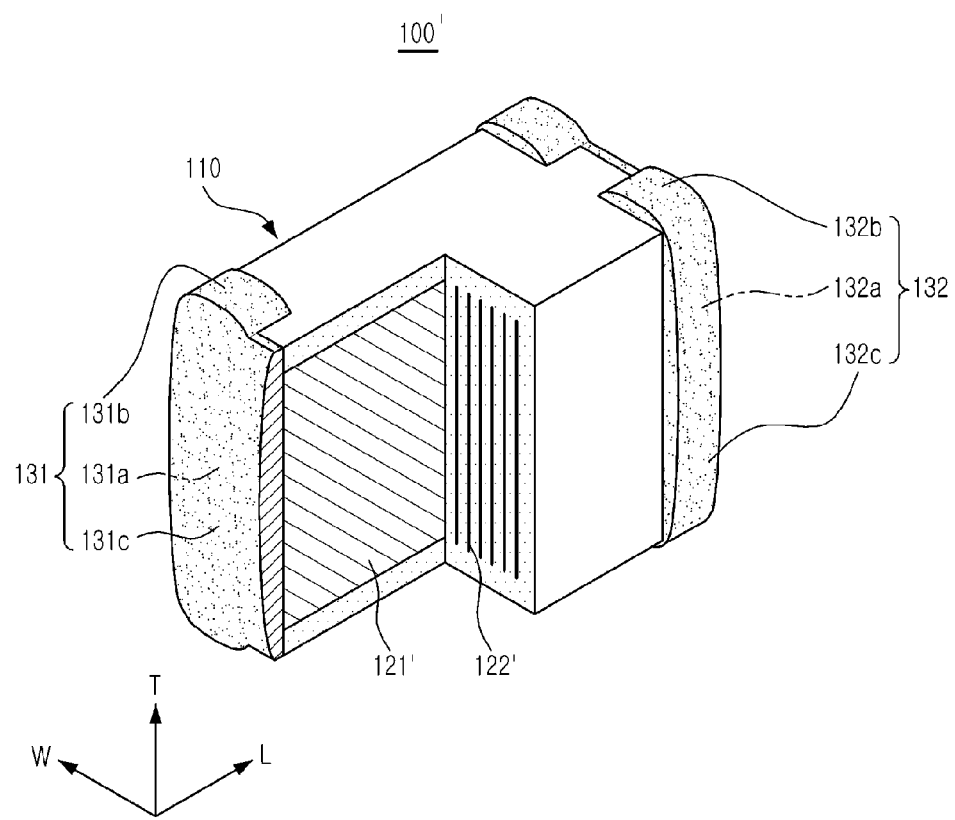
FIG. 3 is a partially cut-away perspective view schematically showing a multilayer ceramic capacitor according to another embodiment of the present invention.

FIG. 3 is a partially cut-away perspective view schematically showing a multilayer ceramic capacitor according to another embodiment of the present invention.

Here, since a structure in which the first and second external electrodes 131 and 132 are formed is the same as that of the foregoing described embodiment, detailed descriptions thereof will be omitted in order to avoid the overlapped portion, and descriptions of a first internal electrode 121' and a second internal electrode 122' having a different structure from the foregoing described embodiment of the present invention will be described in detail.

Referring to FIG. 3, a multilayer ceramic capacitor 100' according to another embodiment of the present invention may include the ceramic body 110 having the plurality of dielectric layers 111 stacked in a width direction.

Therefore, the first internal electrode 121' and the second internal electrode 122' may be disposed to face each other in the width direction, having the ceramic sheet forming the dielectric layer 111 interposed therebetween, and may be formed in the ceramic body 110 so as to be exposed through the first and second end surfaces of the ceramic body 110, respectively. In this case, the first and second internal electrodes 121' and 122' may be electrically insulated from each other by the dielectric layer 111 interposed therebetween.

Figure 4:
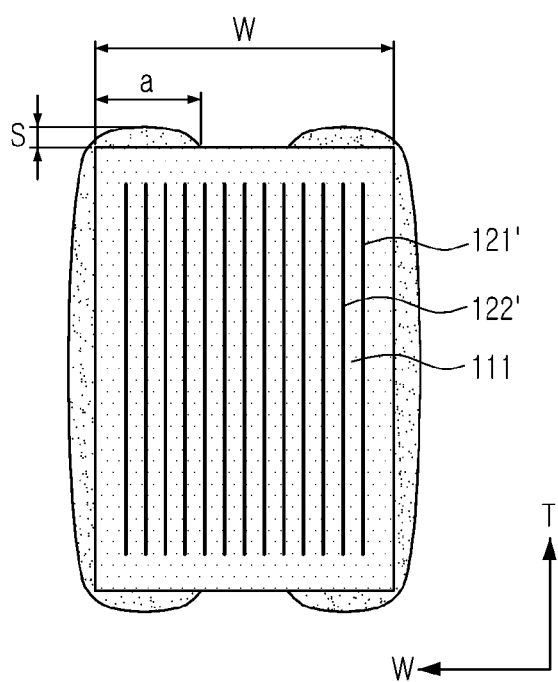
FIG. 4 is a cross-sectional view taken along line B-B' of FIG. 3.

FIG. 4 is a cross-sectional view taken along line B-B' of FIG. 3 and shows a thickness-width cross section of the multilayer ceramic capacitor according to another embodiment of the present invention.

It may be appreciated from FIG. 4 that when it is defined that the width of the ceramic body 110 is W and the width of the band parts 131b and 132b on the external electrodes is a, $0.10 \leq a/W \leq 0.45$ may be satisfied.

In addition, when a thickness of the band parts 131b and 132b is defined as S, $2 \leq S \leq 40$ μm may be satisfied.

Manufacturing Method of Multilayer Ceramic Capacitor

Hereinafter, a manufacturing method of the multilayer ceramic capacitor according to the embodiment of the present invention will be described.

First, a plurality of ceramic sheets are prepared. In forming the dielectric layer 111 of the ceramic body 110, the ceramic sheets are produced by mixing a ceramic powder, a polymer, a solvent, and the like, to prepare a slurry, and then applying the slurry to and drying the slurry on a carrier film using a doctor blade method, or the like, to be a sheet having a thickness of several μm.

Then, the conductive paste is printed on at least one surface of the ceramic sheet to have a predetermined thickness to thereby form the plurality of internal electrode patterns having a predetermined interval therebetween in a length direction.

A printing method of the conductive paste for forming the internal electrode pattern may include a screen printing method, a gravure printing method, and the like, but the present invention is not limited thereto.

Then, a multilayer body may be prepared by alternately stacking the plurality of ceramic sheets having the internal electrode patterns formed thereon in the thickness direction so that the internal electrode patterns alternate with each other and compressing the ceramic sheets in a stacking direction. Here, in the multilayer body, with respect to the stacking direction of the ceramic sheets, the ceramic sheets may be stacked on each other such that the internal electrode patterns may be stacked in the thickness direction or the width direction, based on a mounting surface thereof.

Next, the multilayer body may be separated into portions corresponding to regions thereof forming respective single capacitors having 0603 (length×width) standard size to prepare chips having a value of thickness/width greater than 1.0 and having the first and second main surfaces opposing each other in the thickness direction thereof, the first and second end surfaces opposing each other in the length direction in which the first and second internal electrodes 121 and 122 are alternately exposed, and first and second side surfaces opposing each other in the width direction thereof, and the prepared chips may be sintered at a high temperature of 1050 to 1200° C. and polished to prepare the ceramic body 110.

Then, first and second external electrodes 131 and 132 may be formed on the first and second end surfaces of the ceramic body 110 so as to be electrically connected to exposed portions of the first and second internal electrodes 121 and 122.

Here, in the forming of the first and second external electrodes 131 and 132, in a thickness-width cross section of the ceramic body 110, head parts 131a and 132a may be formed on the first and second end surfaces and two band parts 131b and 132b may be formed on the first and second main surfaces so as to be spaced apart from each other, by applying a conductive paste to both edge parts at which the first and second main surfaces and the first and second side surfaces contact each other.

In addition, as needed, after the first and second external electrodes 131 and 132 are formed, a plating process such as an electroplating process may be performed on surfaces of the first and second band parts 131b and 132b, such that first and second plating layers (not shown) may be formed.

Here, when it is defined that the width of the ceramic body 110 is W and the width of the band parts 131b and 132b on the external electrodes is a, $0.10 \leq a/W \leq 0.45$ may be satisfied.

Board for Mounting Multilayer Ceramic Capacitor

Figure 5:
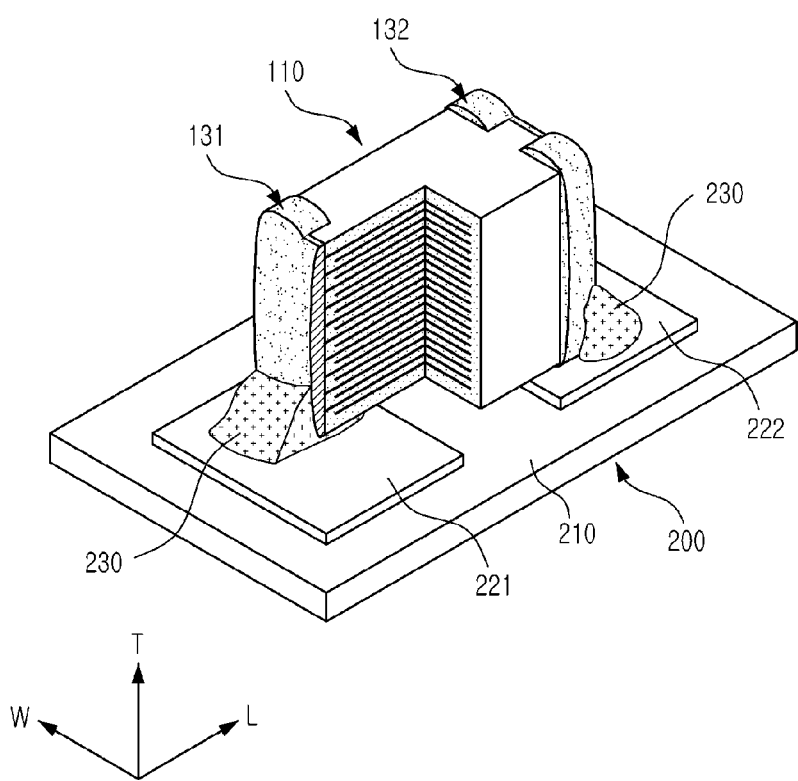
FIG. 5 is a partially cut-away perspective view schematically showing the multilayer ceramic capacitor mounted on the printed circuit board according to the embodiment of the present invention.

FIG. 5 is a partially cut-away perspective view schematically showing the multilayer ceramic capacitor mounted on the printed circuit board according to an embodiment of the present invention.

Referring to FIG. 5, a board 200 for mounting the multilayer ceramic capacitor 100 according to the present embodiment may include a printed circuit board 210 having the multilayer ceramic capacitor 100 mounted thereon so as to be perpendicular or horizontal thereto, and first and second electrode pads 221 and 222 formed on the printed circuit board 210 to be spaced apart from each other.

Here, the multilayer ceramic capacitor 100 may be electrically connected to the printed circuit board 210 by a solder 230 in a state in which the first and second band parts 131b and 132b of the first and second external electrodes 131 and 132 are positioned to contact the first and second electrode pads 221 and 222, respectively.

As set forth above, according to the embodiment of the present invention, the multilayer ceramic electronic component may achieve a high degree of capacitance, due to the increase in the number of stacked layers and include two band parts spaced apart from each other in the external electrodes, thereby preventing the multilayer ceramic electronic component from toppling over when being mounted on the printed circuit board or the like and thus decreasing mounting defects and the occurrence of short-circuits.

While the present invention has been shown and described in connection with the embodiments, it will be apparent to those skilled in the art that modifications and variations can be made without departing from the spirit and scope of the invention as defined by the appended claims.

What is claimed is:

1. A multilayer ceramic electronic component comprising:
   a ceramic body including a plurality of dielectric layers stacked in a thickness direction thereof and satisfying $T/W > 1.0$ when it is defined that a width thereof is W and a thickness thereof is T;
   a plurality of first and second internal electrodes disposed in the ceramic body so as to face each other, having the dielectric layer interposed therebetween, and alternately exposed through both end surfaces of the ceramic body; and
   first and second external electrodes including head parts formed on both end surfaces of the ceramic body and two band parts connected to the head parts and formed on portions of upper and lower main surfaces of the ceramic body so as to be spaced apart from each other in a width direction thereof, and electrically connected to the first and second internal electrodes, respectively.

2. The multilayer ceramic electronic component of claim 1, wherein when it is defined that a width of the ceramic body is W and a width of the band part is a, $0.10 \leq a/W \leq 0.45$ is satisfied.

3. The multilayer ceramic electronic component of claim 1, wherein when a thickness of the band part is defined as S, $2 \leq S \leq 40$ μm is satisfied.

4. A board for mounting a multilayer ceramic electronic component, comprising:
   a printed circuit board having first and second electrode pads disposed thereon; and
   the multilayer ceramic electronic component of claim 1 installed on the first and second electrode pads.

5. A multilayer ceramic electronic component comprising:
   a ceramic body including a plurality of dielectric layers stacked in a width direction thereof and satisfying $T/W > 1.0$ when it is defined that a width thereof is W and a thickness thereof is T;
   a plurality of first and second internal electrodes disposed in the ceramic body so as to face each other, having the dielectric layer interposed therebetween, and alternately exposed through both end surfaces of the ceramic body; and
   first and second external electrodes formed from both end surfaces to portions of both of upper and lower main surfaces of the ceramic body and electrically connected to the first and second internal electrodes, respectively, wherein the first and second external electrodes include head parts formed on both end surfaces of the ceramic body and two band parts connected to the head parts and formed on portions of upper and lower main surfaces of the ceramic body so as to be spaced apart from each other in the width direction and are electrically connected to the first and second internal electrodes, respectively.

6. The multilayer ceramic electronic component of claim 5, wherein when it is defined that a width of the ceramic body is W and a width of the band part is a, $0.10 \leq a/W \leq 0.45$ is satisfied.

7. The multilayer ceramic electronic component of claim 5, wherein when a thickness of the band part is defined as S, $2 \leq S \leq 40$ μm is satisfied.

8. A manufacturing method of a multilayer ceramic electronic component, the manufacturing method comprising:

preparing a multilayer body by stacking and compressing a plurality of ceramic sheets having first and second internal electrodes formed thereon so that the first and second internal electrodes face each other, having the ceramic sheet interposed therebetween, and preparing a ceramic body having first and second main surfaces opposing each other in a thickness direction thereof, first and second end surfaces in a length direction thereof, to which the first and second internal electrodes are alternately exposed, and first and second side surfaces in a width direction thereof, by cutting the multilayer body to be separated into portions corresponding to regions thereof forming respective single capacitors to then be sintered; and forming first and second external electrodes in the ceramic body so as to be electrically connected to the first and second internal electrodes, respectively, wherein in the forming of the first and second external electrodes, in a thickness-width cross section of the ceramic body, head parts are formed on the first and second end surfaces and two band parts are formed on the first and second main surfaces so as to be spaced apart from each other by applying a conductive paste to both edge parts at which the first and second main surfaces and the first and second side surfaces contact each other.

9. The manufacturing method of claim 8, wherein in the preparing of the multilayer body, the ceramic sheets are stacked in the thickness direction.

10. The manufacturing method of claim 9, wherein when it is defined that a width of the ceramic body is W and a width of the band part is a, $0.10 \leq a/W \leq 0.45$ is satisfied.

11. The manufacturing method of claim 9, wherein when a thickness of the band part is defined as S, $2 \leq S \leq 40$ μm is satisfied.

12. The manufacturing method of claim 8, wherein in the preparing of the multilayer body, the ceramic sheets are stacked in the width direction.

13. The manufacturing method of claim 12, wherein when it is defined that a width of the ceramic body is W and a width of the band part is a, $0.10 \leq a/W \leq 0.45$ is satisfied.

14. The manufacturing method of claim 12, wherein when a thickness of the band part is defined as S, $2 \leq S \leq 40$ μm is satisfied.

* * * * *